J DILL.
Dovetailing and Grooving Machine.

No. 197,835.  Patented Dec. 4, 1877.

WITNESSES  Joseph Dill  INVENTOR
By his Attys.

UNITED STATES PATENT OFFICE.

JOSEPH DILL, OF BOSTON, MASSACHUSETTS.

IMPROVEMENT IN DOVETAILING AND GROOVING MACHINES.

Specification forming part of Letters Patent No. 197,835, dated December 4, 1877; application filed May 15, 1877.

*To all whom it may concern:*

Be it known that I, JOSEPH DILL, of Boston, in the county of Suffolk and State of Massachusetts, have invented a new and useful Improvement in Dovetailing and Grooving Machines, which improvement is fully set forth in the following specification and accompanying drawings, in which—

Figure 1:
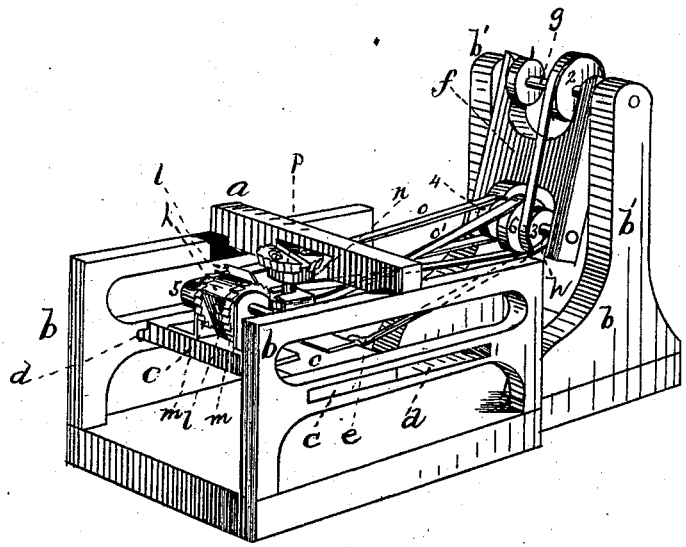
Figure 4:
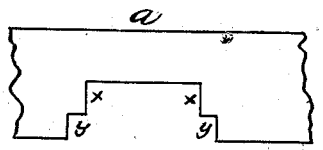
Figure 5:
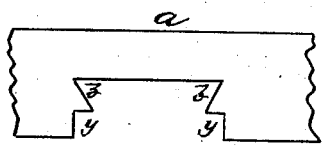
Figure 2:
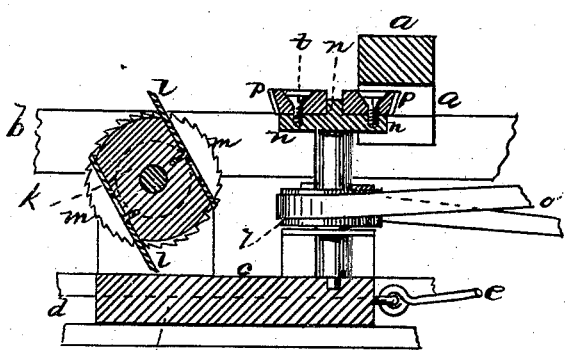
Figure 3:
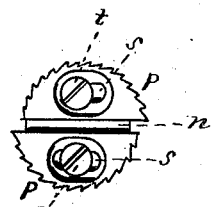

Figure 1 is a perspective view, with a piece of lumber upon the machine, having a dovetail groove cut in it. Fig. 2 is a longitudinal sectional view of a portion of the machine. Fig. 3 is a plan view of the adjustable cutter. Fig. 4 is a representation of the groove produced by the first cutter. Fig. 5 shows the dovetail groove produced by the two cutters.

Similar letters of reference indicate corresponding parts.

The object of this machine is, first, to produce the dovetail groove shown in Fig. 5, principally for use in making marquetry-work, and, second, to do any work which the machine is capable of performing.

In the drawing, $a$ represents a piece of wood, having a dovetail groove of the shape shown in Figs. 1 and 5 cut in it by the machine. This piece $a$ is not run up to the cutters to be operated upon, but is placed stationary upon the frame $b$, and the cutters or saws are run against the piece $a$, thus insuring much greater accuracy of work than is possible when the stock is moved against the cutters.

$c$ is a carriage, carrying the cutters and moving in the slots or tracks $d$ in the frame. This carriage is connected by rods $e\ e$ with the swinging frame $f$, which swings between the upright parts $b'$ of the frame $b$.

$g$ and $h$ are shafts, placed, respectively, in the upper and lower portions of the swinging frame $f$, and having pulleys fixed upon them for the purpose of transmitting power to the cutters. 1 is the actuating-pulley upon shaft $g$. A belt connects the shafts $g$ and $h$ by passing over pulleys 2 and 3. Power is transmitted from shaft $h$ by means of the belt $o$, which passes from pulley 4 to pulley 5, which actuates the cutter-head $k$. (See Fig. 2.)

When the carriage $c$ is moved toward the stock $a$ the cutters carried by the cutter-head $k$ are the first to reach the piece $a$. They cut the groove shown in Fig. 4. There are two sets of cutters upon this cutter-head—viz., the inside cutters $l\ l$, which cut the groove $x\ x$, Fig. 4, and the outside saws or cutters $m\ m$, which cut the portion $y\ y$, Fig. 4. Neither of these cutters is new in itself.

The belt $o'$ transmits power from pulley 6 to pulley 7, which operates the horizontal cutter-head $n$. (See Figs. 2 and 3.) This cutter-head $n$ reaches the piece $a$ after the cutters $l\ m$ have cut the groove $x\ y$ in it. The saws $p\ p$ upon the cutter-head $n$ are intended to cut the dovetail groove $z\ z$, Fig. 5, and thus complete the shape of the groove $z\ y$. The saws $p$ are, of course, beveled at the proper angle for the purpose.

These saws $p$ are made adjustable, so as to be capable of cutting grooves of greater or less width, by being provided with slots $s\ s$, through which screws or nuts $t\ t$ pass, attaching said saws to the cutter-head.

Thus it will be seen that the dovetail groove $z\ y$, Fig. 5, is produced with great accuracy, and without necessitating moving the stock.

Of course suitable means will be provided for moving the carriage back and forth and holding the stock in place.

The extension-saw or adjustable cutters $p\ p$ may be arranged to meet and fit at their straight inner edges, instead of sliding against the central raised portion of the cutter-head $n$, if desired.

Having thus fully described my invention, what I claim, and desire to secure by Letters Patent, is—

The combination of the cutter-head $k$, having cutters $l\ l\ m\ m$ attached, and the cutter-head $n$, having the horizontal cutters $p\ p$ attached, both cutter-heads being placed upon the carriage $c$, for the purpose of producing the dovetail groove $z\ y$ in a stationary piece of stock, all arranged substantially and operating as above set forth.

JOSEPH DILL.

Witnesses:
HENRY W. WILLIAMS,
JAS. H. REED, Jr.